United States Patent
Liu et al.

(10) Patent No.: US 10,522,178 B1
(45) Date of Patent: Dec. 31, 2019

(54) HIGH DAMPING SHIELD WITH LOW MAGNETIC MOMENT IN PERPENDICULAR MAGNETIC RECORDING (PMR) WRITER

(71) Applicant: Headway Technologies, Inc., Milpitas, CA (US)

(72) Inventors: Ying Liu, San Jose, CA (US); Yue Liu, Fremont, CA (US); Kei Hirata, Sunnyvale, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/111,519

(22) Filed: Aug. 24, 2018

(51) Int. Cl.
*G11B 5/31* (2006.01)
*G11B 5/60* (2006.01)
*G11B 5/127* (2006.01)
*G11B 5/11* (2006.01)

(52) U.S. Cl.
CPC .............. *G11B 5/6082* (2013.01); *G11B 5/11* (2013.01); *G11B 5/1278* (2013.01); *G11B 5/315* (2013.01); *G11B 5/3109* (2013.01); *G11B 5/3116* (2013.01)

(58) Field of Classification Search
None
See application file for complete search history.

(56) References Cited

U.S. PATENT DOCUMENTS

| 6,353,511 | B1 | 3/2002 | Shi et al. |
| 6,809,899 | B1 | 10/2004 | Chen et al. |
| 6,954,340 | B2 | 10/2005 | Shukh et al. |
| 7,009,812 | B2 | 3/2006 | Hsu et al. |
| 7,113,367 | B2 | 9/2006 | Yazawa et al. |
| 7,835,111 | B2 | 11/2010 | Flint et al. |
| 7,963,024 | B2 | 6/2011 | Neuhaus |

(Continued)

FOREIGN PATENT DOCUMENTS

| JP | 2002-133610 | 5/2002 |
| JP | 2002-298309 | 10/2002 |

(Continued)

OTHER PUBLICATIONS

"Effect of 3d, 4d, and 5d transition metal doping on damping in permalloy thin films," by J. O. Rantschler et al., Journal of Applied Physics 101, 033911, Feb. 14, 2007, pp. 1-5.

(Continued)

*Primary Examiner* — William J Klimowicz
(74) *Attorney, Agent, or Firm* — Saile Ackerman LLC; Stephen B. Ackerman

(57) ABSTRACT

A PMR writer is disclosed with an all wrap around (AWA) shield design in which one or more of the leading shield, lead edge taper (LET), and side shields are comprised of a low moment high damping (LMHD) magnetic material having a damping constant ≥0.04 and a magnetic flux density (Bs) from 1 kilogauss (kG) to 8 kG. The LMHD magnetic material may be FeNiM, FeCoM, FeNM, or FeCoNiM where M is a 3d, 4d, or 5d transition metal. The LET layer has a tapered side adjoining the leading gap and with a thickness that decreases to zero at height h1 of 50 nm to 500 nm from the air bearing surface. The leading shield also has a backside at h1. Wide adjacent track erasure is minimized while area density capability is enhanced compared with conventional shields with Bs from 10-19 kG.

13 Claims, 11 Drawing Sheets

(56) References Cited

U.S. PATENT DOCUMENTS

| | | | |
|---|---|---|---|
| 8,089,723 | B2 | 1/2012 | Schabes |
| 8,264,792 | B2 | 9/2012 | Bai et al. |
| 8,295,008 | B1 | 10/2012 | Sasaki et al. |
| 8,310,787 | B1 | 11/2012 | Sasaki et al. |
| 8,462,461 | B2 | 6/2013 | Braganca et al. |
| 8,477,452 | B2 | 7/2013 | Sasaki et al. |
| 8,493,687 | B2 | 7/2013 | Sasaki et al. |
| 8,749,919 | B2 | 6/2014 | Sasaki et al. |
| 9,437,220 | B2 | 9/2016 | Bashir et al. |
| 9,466,319 | B1* | 10/2016 | Tang .................... G11B 5/1278 |
| 9,508,364 | B1* | 11/2016 | Tang ...................... G11B 5/112 |
| 9,704,510 | B2 | 7/2017 | Lu et al. |
| 9,990,942 | B1* | 6/2018 | Liu ...................... G11B 5/3116 |
| 10,014,021 | B1* | 7/2018 | Liu .................... G11B 5/1278 |
| 10,311,899 | B2* | 6/2019 | Liu ...................... G11B 5/3116 |
| 10,347,276 | B2* | 7/2019 | Tang |
| 2002/0034043 | A1 | 3/2002 | Okada et al. |
| 2004/0150910 | A1 | 8/2004 | Okada et al. |
| 2005/0128637 | A1 | 6/2005 | Johnston et al. |
| 2005/0141137 | A1 | 6/2005 | Okada et al. |
| 2006/0044682 | A1 | 3/2006 | Le et al. |
| 2006/0087765 | A1 | 4/2006 | Iwakura et al. |
| 2006/0103978 | A1 | 5/2006 | Takano et al. |
| 2007/0177301 | A1 | 8/2007 | Han et al. |
| 2008/0013209 | A1 | 1/2008 | Sasaki et al. |
| 2008/0088972 | A1 | 4/2008 | Sasaki et al. |
| 2009/0059426 | A1 | 3/2009 | Sasaki et al. |
| 2009/0128953 | A1 | 5/2009 | Jiang et al. |
| 2009/0296275 | A1 | 12/2009 | Sasaki et al. |
| 2010/0165517 | A1 | 7/2010 | Araki et al. |
| 2012/0050921 | A1 | 3/2012 | Marshall |
| 2018/0144768 | A1* | 5/2018 | Liu ........................ G11B 5/3116 |
| 2018/0277147 | A1* | 9/2018 | Liu ........................ G11B 5/3116 |
| 2018/0330748 | A1* | 11/2018 | Liu .......................... G11B 5/112 |

FOREIGN PATENT DOCUMENTS

| | | |
|---|---|---|
| JP | 2008-021398 | 1/2008 |
| JP | 2010-157303 | 7/2010 |

OTHER PUBLICATIONS

"Micromagnetic Analysis of Adjacent Track Erasure of Wrapped-Around Shielded PMR Writers," by Suping Song et al., IEEE Transactions on Magnetics, vol. 45, No. 10, Oct. 2009, pp. 3730-3732.

"Characterization of Adjacent Track Erasure in Perpendicular Recording by a Stationary Footprint Technique," by Yuhui Tang et al., IEEE Transactions on Magnetics, vol. 49, No. 2, Feb. 2013, pp. 744-750.

"Magnetic Damping in Ferromagnetic Thin Films," by Mikihiko Oogane et al., Japanese Journal of Applied Physics, vol. 45, No. 5A, May 9, 2006, pp. 3889-3891.

English translation of Office Action issued in Japanese Patent Application No. 2011-149242, dated Nov. 13, 2012, Ref No. SA10012, pp. 1-3.

English translation of Office Action issued in Japanese Patent Application No. 2011-149243, dated Nov. 13, 2012, Ref No. SA10013, pp. 1-4.

English translation of Office Action issued in Japanese Patent Application No. 2011-149244, dated Nov. 13, 2012, Ref No. SA10014, pp. 1-3.

Office Action in U.S. Appl. No. 12/964,202, dated Nov. 28, 2012, 11 pages.

* cited by examiner

HIGH DAMPING SHIELD WITH LOW MAGNETIC MOMENT IN PERPENDICULAR MAGNETIC RECORDING (PMR) WRITER

RELATED PATENT APPLICATIONS

This application is related to the following: U.S. Pat. Nos. 8,749,919; and 9,466,319; assigned to a common assignee and herein incorporated by reference in their entirety.

TECHNICAL FIELD

The present disclosure relates to a shield structure in a PMR write head wherein one or more of a leading shield, side shields, and leading edge taper are made of a high damping magnetic material such as FeNiRe that has a low magnetic flux density (Bs) from 1 to 8 kiloGauss (kG) thereby shifting more of the main pole field return path from the leading side and cross-track directions to the trailing side so that higher areal density capability (ADC) is achieved.

BACKGROUND

Perpendicular magnetic recording has been developed in part to achieve higher recording density than is realized with longitudinal recording devices. A PMR write head typically has a main pole with a small surface area at an air bearing surface (ABS), and coils that conduct a current and generate a magnetic flux in the main pole such that the magnetic flux exits through a write pole tip and enters a magnetic medium (disk) adjacent to the ABS. Magnetic flux is used to write a selected number of bits in the magnetic medium and typically returns to the main pole through two pathways including a trailing loop and a leading loop in a so-called double write shield (DWS) structure. The trailing loop comprises a trailing shield structure with a side at the ABS and a portion that extends over the write coils and connects to a top surface of the main pole layer above a back gap magnetic connection. The leading loop includes a leading shield with a side at the ABS and that is connected to a return path proximate to the ABS. The return path extends to the back gap connection and enables magnetic flux in the leading loop pathway to return from the leading shield at the ABS and through the back gap connection to the main pole layer. A PMR head which combines the features of a single pole writer and a double layered medium (magnetic disk) has a great advantage over LMR in providing higher write field, better read back signal, and potentially much higher ADC.

For both conventional (CMR) and shingle magnetic recording (SMR), continuous improvement in storage area density is required for a PMR writer. A write head that can deliver or pack higher bits per inch (BPI) and higher tracks per inch (TPI) is essential to the area density improvement. A fully wrapped around shield design also known as an all wrap around (AWA) shield structure for a PMR write head is advantageously used so that the trailing shield enhances the down track field gradient while side shields and a leading shield improve the cross track field gradient and TPI as well as adjacent track erasure (ATE) performance. However, conventional side and leading shields that are generally made of CoFe, NiFe, CoFeN, or CoFeNi with a Bs above 10 kG appear to be limited in providing better ADC performance.

In hard disk drives (HDD), minimizing ATE is one of the most critical issues for PMR writer designs. Both micromagnetic modeling that is described by S. Song et al. in "Micromagnetic analysis of adjacent track erasure of wrapped-around shielded PMR writers", IEEE Trans. Magn., vol. 45, no. 10, pp. 3730-3732 (2009), and experimental data described by Y. Tang et al. in "Characterization of Adjacent Track Erasure in Perpendicular Recording by a Stationary Footprint Technique", IEEE Trans. Magn., vol. 49, no. 2, pp. 744-750 (2013) indicate that one root cause of ATE is the stray field from side shields and leading shield during the dynamic writing cycles. It is observed that adjacent track erasure has strong writing frequency dependence and can be expected to be much more severe as increased ultra-high data rate HDDs are produced in the future.

Thus, an optimized PMR writer with an improved shield structure is desirable that not only provides better ADC, but also delivers acceptable ATE for advanced HDD products. Ideally, the new shield structure should maintain the geometrical shape of conventional shields to avoid a costly redesign.

SUMMARY

One objective of the present disclosure is to provide a magnetic shield structure for a PMR writer that minimizes ATE while also improving ADC compared with conventional shields made of alloys having a Bs≥10 kG.

Another objective of the present disclosure is to provide a method of fabricating a shield design according the first objective that is readily implemented in existing process flows.

According to a first embodiment, these objectives are achieved with a PMR writer shield configuration having an AWA design wherein one or more of a leading shield (LS), side shields, and a leading edge taper (LET) that is formed between the LS and leading gap are made a high damping magnetic material with a Gilbert damping constant ($\alpha$) of at least 0.04, and preferably ≥0.05, and have a low moment (Bs) from 1 kG to 8 kG. The low moment high damping (LMHD) material may be FeNiRe or other alloys including but not limited to FeCoRe, FeCoNiRe, FeNiM, FeCoM, FeNM, and FeCoNiM where M is one of Os, Ir, Rh, Ti, Ta, V, Cr, W, Mn, Mo, Cu, Zr, Nb, Hf, Ru, Pd, Pt, Ag, and Au. The Re or M content in the LMHD material is preferably from 1 atomic % to 10 atomic %.

The main pole has a leading side with a leading edge at the ABS that is separated from the LET and LS by a leading gap, a trailing side with a trailing edge at the ABS that is separated from a first trailing shield by a write gap, and two sides connecting the trailing and leading sides wherein the two sides are formed equidistant from a center plane that is orthogonal to the trailing and leading sides. The leading side is tapered with respect to a second plane that includes a leading edge at the ABS and where the second plane is also formed orthogonal to the center plane and to the ABS. Each main pole side is separated from a side shield by a side gap. The write gap, side gaps, and leading gap are comprised of a dielectric material.

According to one embodiment, the leading shield is made of a LMHD material while the LET, side shields, and second trailing shield (TS) are a conventional alloy such as CoFe, NiFe, CoFeN, or CoFeNi with a Bs from 10 kG to 19 kG. The second TS contacts the side shields at a first plane that includes the main pole (MP) trailing side. A first TS that is a 19-24 kG hot seed layer is formed on the write gap and below the second TS. In a second embodiment, the first embodiment is modified with replacing the conventional alloy in the LET with a LMHD material. In a third embodiment, all of the LS, LET, and side shields consist of the LMHD material. In each embodiment, the backside of the LS, LET, and side shields (SS) may be at a height of 150 nm to 350 nm from the air bearing surface (ABS).

A method for forming an AWA shield structure according to the aforementioned embodiments is also provided. In one embodiment, the LMHD magnetic (LS) layer, and a conventional magnetic alloy (LET/SS) layer are sequentially deposited on a substrate. An opening with sidewalls is formed in an upper side shield portion of the conventional alloy layer that exposes a section of a bottom (LET) portion thereof. An etch process such as an ion beam etch (IBE) is used to form a taper in the exposed bottom portion where a backend of the taper is at a top surface of the LMHD layer. Thus, the LET layer has a first thickness at a front side thereof that gradually decreases to 0 at the LET backend at a first height (h1) from the eventual ABS plane. Thereafter, a gap layer is conformally deposited on the sidewalls and bottom surface of the opening to form side gaps and a leading gap, respectively. Next, the main pole layer is plated to fill the opening, and a chemical mechanical polish process is performed to form a planar top surface of the main pole, side gaps, and the side shields. The write gap and first TS layer are sequentially deposited on the planar top surface, and are then etched to remove portions thereof except above the MP top surface, side gaps, and a portion of the side shields adjacent to the side gaps. Next, the second TS is plated on exposed portions of the side shields and on the first TS. The overlying layers in the PMR write head are then formed on the second TS by conventional processes.

DETAILED DESCRIPTION

Figure 1:
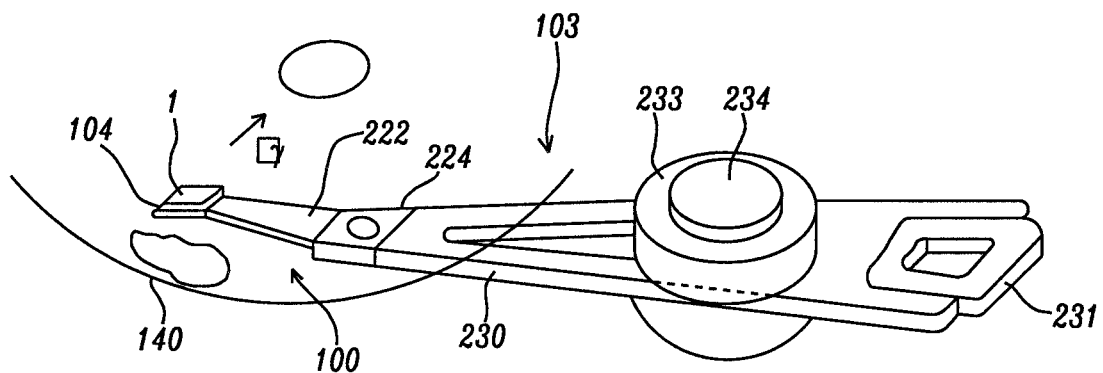
FIG. 1 is a perspective view of a head arm assembly of the present disclosure.

The present disclosure relates to a low moment (Bs=1-8 kG) high damping magnetic (LMHD) layer made of a material with a Gilbert damping constant ($\alpha$) of at least 0.04, and preferably $\geq 0.05$ in one or more of a leading shield, side shields, and leading shield taper in order to enhance ADC and minimize ATE in advanced HDD devices. In the drawings, the y-axis is a cross-track direction, the z-axis is a down-track direction, and the x-axis is in a direction orthogonal to the ABS and towards a back end of the PMR writer. The shield design described herein is compatible with a variety of PMR writer structures and is not limited to a specific write head structure or to a particular combined read head/write head configuration.

Referring to FIG. 1, a HGA 100 includes a magnetic recording head 101 comprised of a slider and a combined read-write structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 101 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
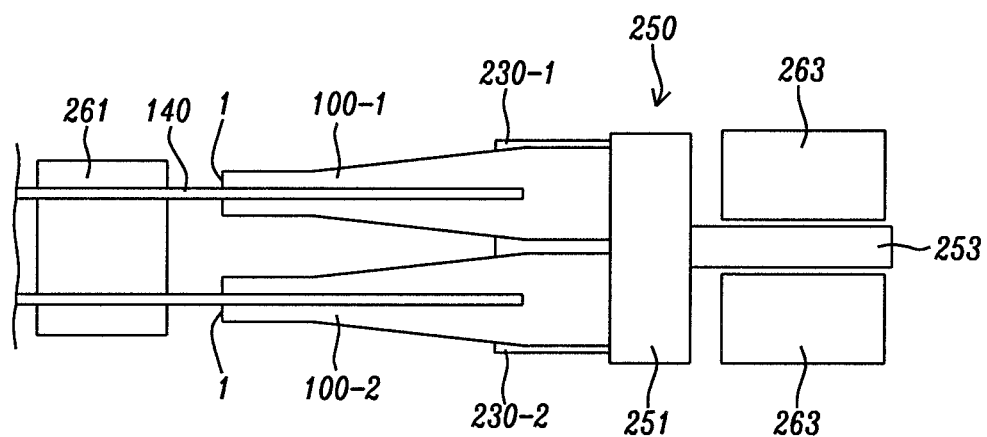
FIG. 2 is side view of a head stack assembly of the present disclosure.

Next, a side view of a head stack assembly (FIG. 2) and a plan view of a magnetic recording apparatus (FIG. 3) wherein the magnetic recording head 101 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
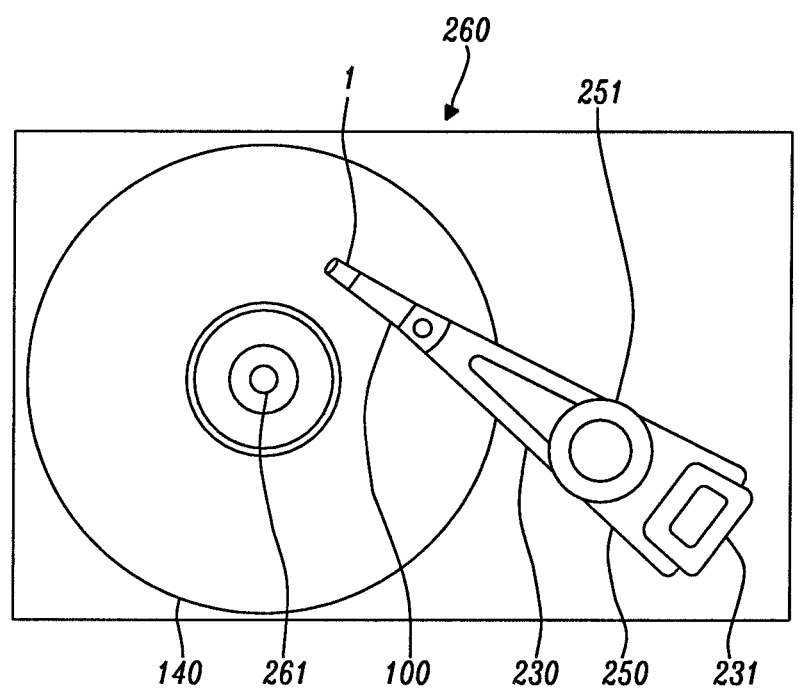
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to a spindle motor 261. For every magnetic recording medium, there are two magnetic recording heads arranged opposite one another across the magnetic recording medium. The head stack assembly and actuator except for the magnetic recording heads 101 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a perpendicular magnetic recording (PMR) writer element (not shown) and reproduces the information recorded in the magnetic recording media by a magnetoresistive (MR) sensor element (not shown).

Figure 4:
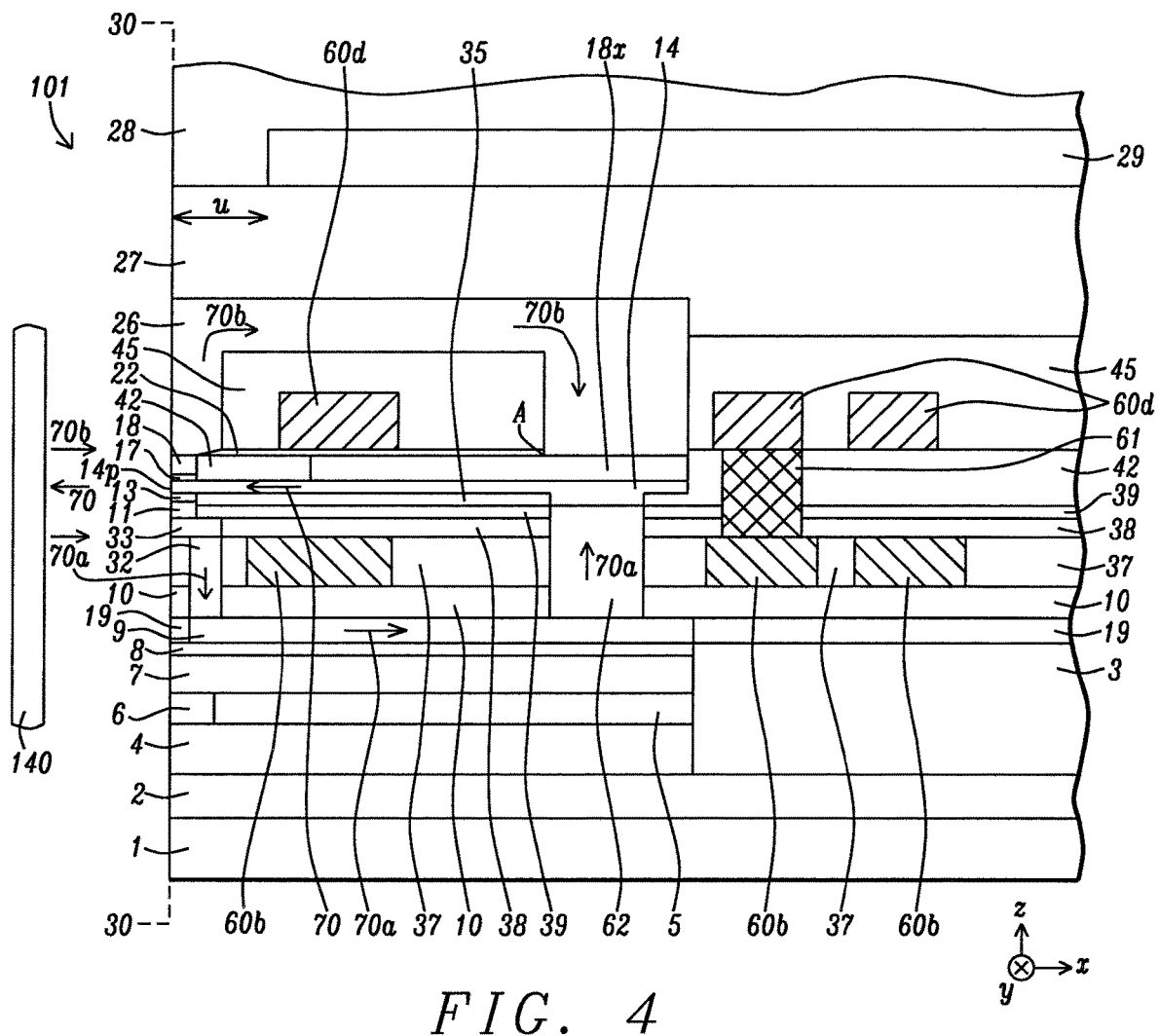
FIG. 4 is a down-track cross-sectional view of a PMR writer with leading and trailing loop pathways for magnetic flux return to the main pole.

Referring to FIG. 4, magnetic recording head 101 comprises a combined read-write head previously fabricated by the inventors and disclosed in related U.S. Pat. No. 9,966, 319. The down-track cross-sectional view is taken along a plane formed orthogonal to the ABS 30-30, and that bisects the main pole layer 14. The read head is formed on a substrate 1 that may be comprised of AlTiC (alumina+TiC) with an overlying insulation layer 2 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 4 is formed on insulation layer 2.

A magnetoresistive (MR) element also known as MR sensor 6 is formed on bottom shield 4 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 5 adjoins the backside of the MR sensor, and insulation layer 3 contacts the backsides of the bottom shield and top shield 7. The top shield is formed on the MR sensor. An insulation layer 8 and a top shield (S2B) layer 9 are sequentially formed on the top magnetic shield. Note that the S2B layer 9 may serve as a flux return path (RTP) in the write head portion of the combined read/write head. Thus, the portion of the combined read/write head structure formed below layer 9 in FIG. 4 is typically considered as the read head. In other embodiments (not shown), the read head may have a dual reader design with two MR sensors, or a multiple reader design with multiple MR sensors.

The present disclosure anticipates that various configurations of a write head (PMR writer) may be employed with the read head portion. In the exemplary embodiment, magnetic flux 70 in main pole (MP) layer 14 is generated with flowing a current through bucking coil 60$b$ and driving coil 60$d$ that are below and above the main pole layer, respectively, and are connected by interconnect 61. Magnetic flux 70 exits the main pole layer at pole tip 14$p$ at the ABS 30-30 and is used to write a plurality of bits on magnetic media 140. Magnetic flux 70$b$ returns to the main pole through a trailing loop comprised of trailing shields 17, 18, PP3 shield 26, and top yoke 18$x$. There is also a leading return loop for magnetic flux 70$a$ that includes leading shield 11, leading shield connector (LSC) 33, S2C 32, return path 9, and back gap connection (BGC) 62. The magnetic core may also comprise a bottom yoke 35 below the main pole layer. Dielectric layers 10, 11, 13, 19, 22, 37-39, 42, and 45 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Figure 5:
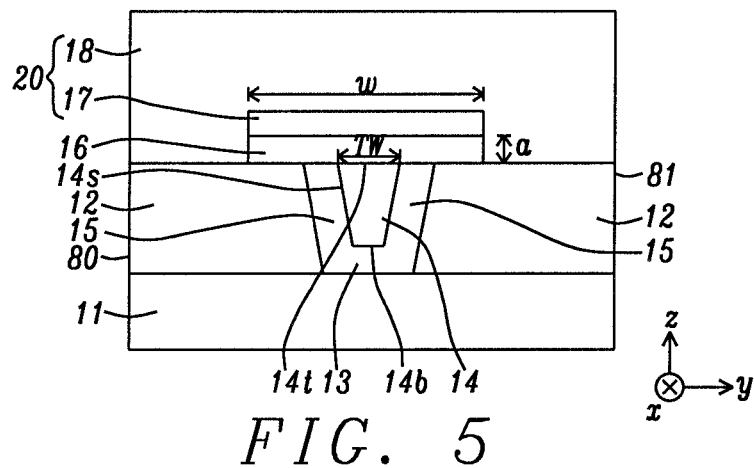
FIG. 5 is an ABS view of the PMR writer in FIG. 4 that shows an all wrap around (AWA) shield structure including a trailing shield, sides shields, and a leading shield wherein each shield has a Bs of at least 10 kG.

Referring to FIG. 5, an ABS view of the PMR writer in FIG. 4 is depicted according to a structure previously fabricated by the inventors and described in related U.S. Pat. No. 9,966,319. Leading shield 11, side shields 12 and trailing shield 20 form an all wrap around (AWA) design. Leading shield and side shields are generally made of a 10-19 kG material, and the first trailing shield is preferably a composite with a lower 19-24 kG hot seed layer (first trailing shield) 17 contacting a top surface of the write gap 16, and a 10-19 kG layer (second trailing shield 18) adjoining a top surface of the hot seed layer and contacting a top surface of side shields 12. The leading shield adjoins a bottom surface of leading gap 13, and side shields adjoin a side of the side gap. All shields are typically made of a conventional alloy such as CoFe, NiFe, CoFeN, or CoFeNi. Write gap 16 has a thickness a, and a cross-track width w greater than track width TW that is essentially the width of trailing edge 14$t$. The write gap contacts a top surface (trailing edge 14$t$) of the MP tip in addition to top surfaces of side gaps 15 and portions of side shields 12 that are proximate to the side gaps. Each side shield extends from an inner side that interfaces with a side gap to an outer side 80 or 81.

The PMR writer in FIG. 5 requires optimization for use in advanced technologies. In particular, a thinner write gap thickness a, and narrower side gap width are the preferred directions for better on track field gradient (BPI) and cross-track field gradient (TPI), respectively. As gap dimensions shrink and write pole dimensions become smaller, it is important to devise a scheme whereby ATE is controlled and ADC is enhanced.

During dynamic magnetic recording, the high frequency magnetic field generated from the main pole will excite the dynamic magnetization rotation inside all of the surrounding shields. The dynamic magnetization rotations will propagate away from the main pole, and due to complicated domains in the shields including the trailing shield, the resulting magnetization wave may trigger localized magnetic charges that will cause ATE. It is believed that shields made of a high damping magnetic material will significantly reduce the propagation distance of the dynamic magnetization rotation wave due to fast energy dissipation under high damping constant. Hence, localized magnetic charge generation will be minimized in the shield structure thereby reducing ATE. Micromagnetic modeling results are presented in a later section to illustrate the advantages of implementing a shield structure according to an embodiment of the present disclosure.

According to various embodiments of the present disclosure, the objectives of enhanced ADC and minimized ATE are achieved by implementing a LMHD material in at least the leading shield, and optionally in one or both of the LET and side shields. Preferably, the shield structure surrounding the main pole is an AWA design. However, the present disclosure anticipates similar benefits including better ADC with acceptable ATE may be realized with alternative shield schemes such as partial side shields.

Figure 6:
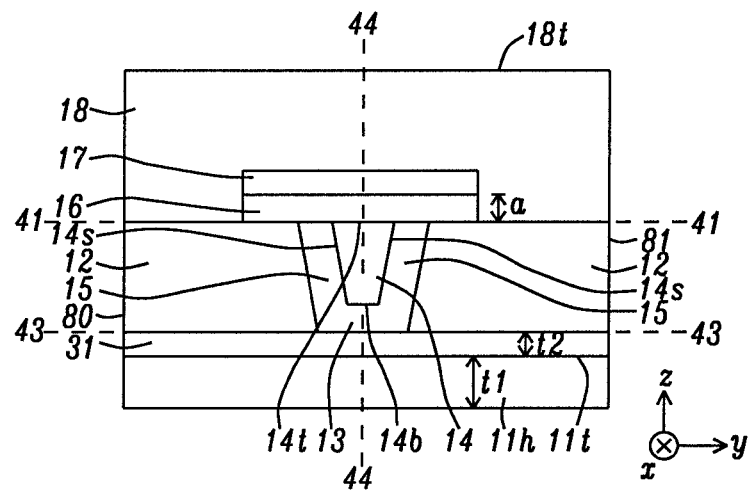
FIG. 6 is an ABS view showing the shield structure of a PMR writer wherein the leading shield (LS) is a high damping (HD) magnetic layer with a Bs from 1-8 kG according to a first embodiment of the present disclosure.

According to a first embodiment of the present disclosure depicted in FIG. 6, the AWA shield structure shown in FIG. 5 is retained except the conventional 10-19 kG magnetic material in LS 11 is replaced with a LMHD magnetic material having a Bs from 1 kG to 8 kG, and a damping parameter $\alpha \geq 0.04$ to provide a leading shield 11h having a down-track thickness t1. Moreover, there is leading edge taper (LET) layer 31 with a down-track thickness t2, where t1>t2, formed between the top surface 11t of LS 11h and plane 43-43 that includes a bottom surface of the leading gap 13. A bottom surface of the second trailing shield 18 contacts the top surfaces of the side shields 12 at plane 41-41 that is orthogonal to center plane 44-44 and also includes the MP trailing edge 14t. MP sides 14s connect the MP leading edge 14b to trailing edge 14t, and are formed equidistant from the center plane that is orthogonal to the ABS. The side shields and LET layer are comprised of an alloy with Bs=10-19 kG that may be a high damping (HD) material with an $\alpha$ of at least 0.04. Each side shield adjoins the LET layer along plane 43-43 which is aligned parallel to plane 41-41.

In some embodiments of the present disclosure, the LMHD magnetic material in LS 11h is $Fe_xNi_{100-x}M$ that is an Fe rich alloy with an x content of ≥50 atomic % and where M is a 3d, 4d, or 5d transition metal with a content between 1 atomic % and 10 atomic %. However, in other embodiments, alloys including but not limited to FeCoM, FeCoNiM, and FeNM where M is one of Re, Os, Ir, Rh, Ti, Ta, V, Cr, W, Mn, Mo, Cu, Zr, Nb, Hf, Ru, Pd, Pt, Ag, and Au with an M content of 1-10 atomic % may also be employed as the LMHD magnetic material. As the M content increases, damping parameter $\alpha$ increases while Bs decreases.

Preferably, the LMHD magnetic layer has a damping parameter $\alpha$ which is at least 0.04, and preferably ≥0.05, that is substantially greater than a typical $\alpha$ value of about 0.02 for commonly used alloys such as FeCo, FeNi, and FeCoNi in shield structures. Moreover, the LMHD magnetic material of the present disclosure preferably has a coercivity (Hc) less than 50 Oe although a Hc≥50 Oe may be acceptable in some cases.

Figure 7:
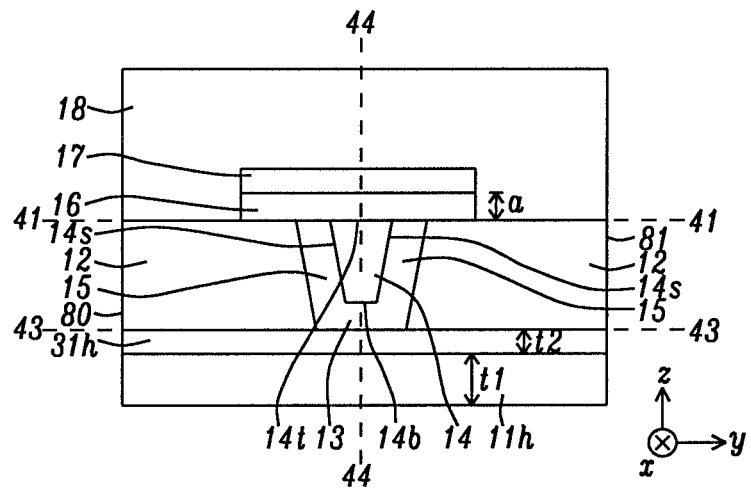
FIG. 7 is an ABS view showing the shield structure of a PMR writer wherein the LS and leading shield taper (LET) are high damping (HD) magnetic layers with a Bs from 1-8 kG according to a second embodiment of the present disclosure.

Referring to FIG. 7, a second embodiment of the present disclosure is depicted and retains all the features of the first embodiment except the LET layer is replaced with LET layer 31h that is a LMHD material. Accordingly, the LET layer is one of the LMHD materials described previously with regard to LS 11h in the first embodiment, and has a thickness t2 between 5 nm and 200 nm. Thickness t1 of LS 11h is from 50 nm to 1000 nm.

Figure 8:
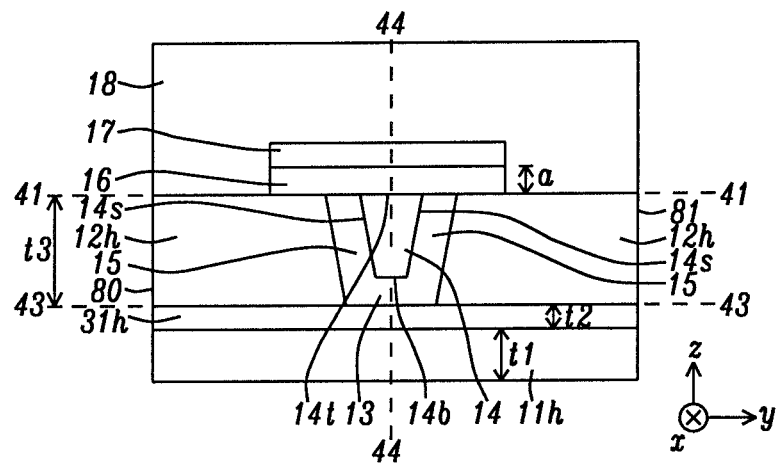
FIG. 8 is an ABS view showing the shield structure of a PMR writer wherein the LS, LET, and side shields are high damping (HD) magnetic layers with a Bs from 1-8 kG according to a third embodiment of the present disclosure.

According to a third embodiment of the present disclosure shown in FIG. 8, the second embodiment may be modified such that the side shields 12h are made of a LMHD material. In the exemplary embodiment, a full side shield is depicted with a down-track thickness t3 of 5 nm to 200 nm between plane 41-41 and plane 43-43. However, in other embodiments (not shown), a partial side shield with a thickness <t3 may be employed.

Figure 9:
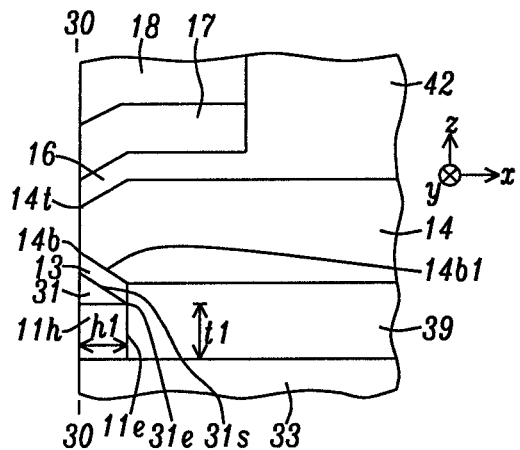
FIG. 9 is a down-track cross-sectional view where the shield structure in FIG. 6 is enlarged to show a leading shield height for the LET and LS.

Referring to FIG. 9, a down-track cross-sectional view of a portion of the TS structure, and the LS 11h and LET layer 31 in FIG. 6 is shown. The LS has a leading shield height (LSh)=h1 that is preferably from 50 nm to 500 nm. The LET layer has decreasing down-track thickness with increasing distance from the ABS 30-30 until reaching 0 nm thickness at back edge 31e. The MP 14 may have a tapered leading side 14b1 that is essentially parallel to tapered top LET side 31s from MP leading edge 14b at the ABS to height h1.

Figure 10:
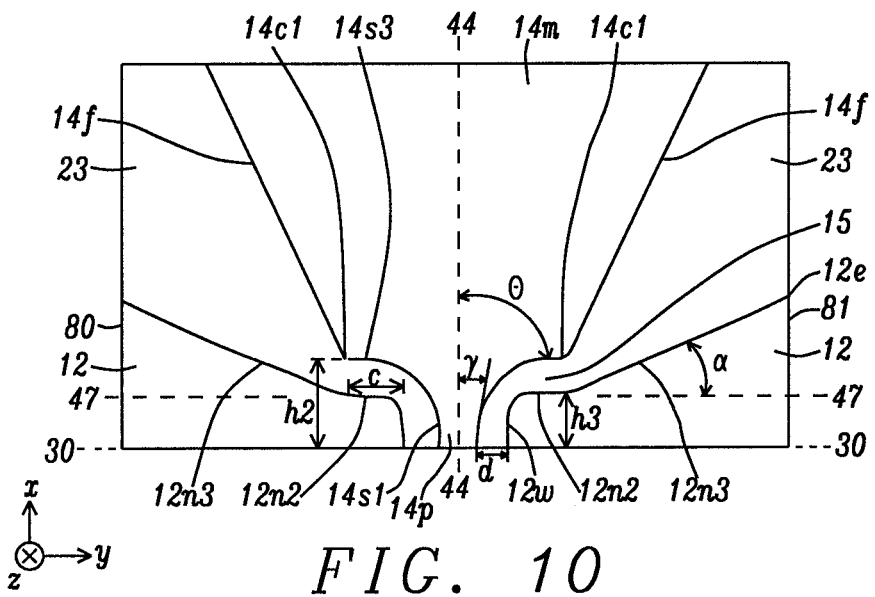
FIG. 10 is a top-down view of the shield structure in FIG. 6 where the trailing shield (TS) is removed to show the side shield (SS) design according to an embodiment of the present disclosure.

Referring to FIG. 10, a top-down view according to one embodiment of the side shield structure of the present disclosure is shown with the write gap and overlying trailing shield layers removed. Center plane 44-44 bisects the main pole including a back portion 14m thereof and is aligned orthogonal to the ABS 30-30. A front portion of the main pole also known as the MP tip 14p has a leading edge 14t at the ABS, and has a curved sidewall on each side of the center plane wherein a first portion 14s1 of curved sidewall is proximate to the ABS, and a second portion 14s3 is proximate to corner 14c1 where the curved sidewall connects with flared side 14f of the main pole back portion. First portion 14s1 forms an attack angle $\gamma$ from 0 to 40 degrees, and preferably 18-20 degrees, with respect to center plane 44-44. In general, as the angle $\gamma$ increases, the cross-track magnetic field gradient degrades. However, as angle $\gamma$ approaches 0 degrees, then writeability is degraded. Therefore, we have found that $\gamma$=18 to 20 degrees is an optimum range to maintain an acceptable cross-track field gradient and writeability.

Preferably, each side shield 12h (or 12 in other embodiments) has a first side shield (SS) sidewall 12w that is a side gap distance d of about 20 nm to 60 nm from first MP portion 14s1, and extends to height h3 that is 30-80 nm from the ABS 30-30. The first SS sidewall is formed at the $\gamma$ angle with respect to the center plane. Furthermore, each side shield has a second sidewall 12n2 with a cross-track width c of 20 nm to 300 nm that is formed substantially parallel to the ABS, and is connected to an end of sidewall 12w at height h3. A third SS sidewall 12n3 is connected to a far end of the second sidewall at plane 47-47 that is at height h3, and extends to a far side 80 (or 81) of the side shield where the far side is a greater distance than h3 from the ABS. Each third SS sidewall preferably forms an angle $\alpha$ of 20 to 60 degrees with respect to plane 47-47. Throat height in the MP tip 14p is essentially the distance (h3) along center plane 44-44 between the ABS and plane 47-47.

Another key feature is a portion 14s3 of the MP sidewall proximate to corners 14c1 where the MP tip 14p intersects the MP back portion 14m. Sidewall 14s3 is formed substantially parallel to second sidewall section 12n2, and is at an angle $\theta$ of preferably 90±5 degrees with respect to center plane 44-44. Greater curvature in the continuous write pole sidewall between the ABS and corner 14c1, expressed here as ($\theta$−$\gamma$), allows corners 14c1 to be at a height h2 of 80 to 150 nm from the ABS, where h2 is typically less than for MP corners in prior art designs. As a result, there is a greater volume of main pole that is within 150 nm of the ABS 30-30 in the FIG. 10 design that leads to less internal flux leakage from main pole to side shields, and better overwrite.

Figure 11:
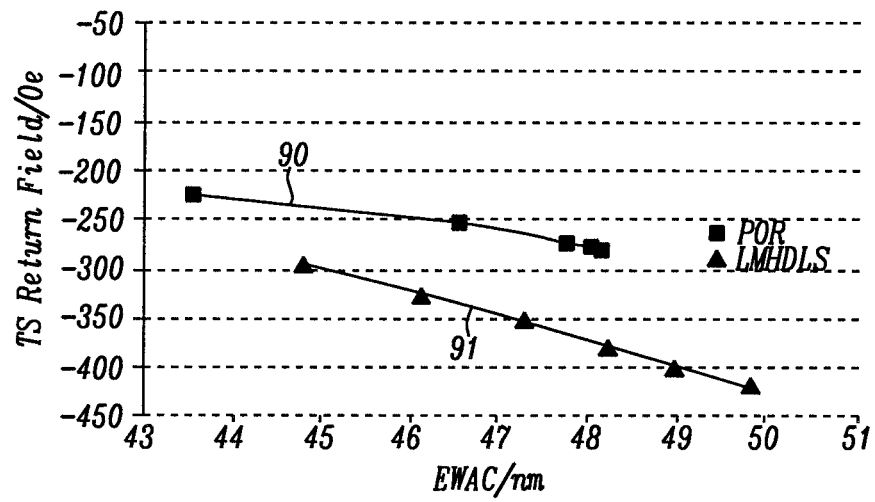
FIG. 11 shows finite element modeling (FEM) simulation results where TS return field is plotted vs. EWAC for the conventional shield design in FIG. 5 and the first embodiment in FIG. 6 where leading shield height (LSh) is 150 nm.
Figure 12:
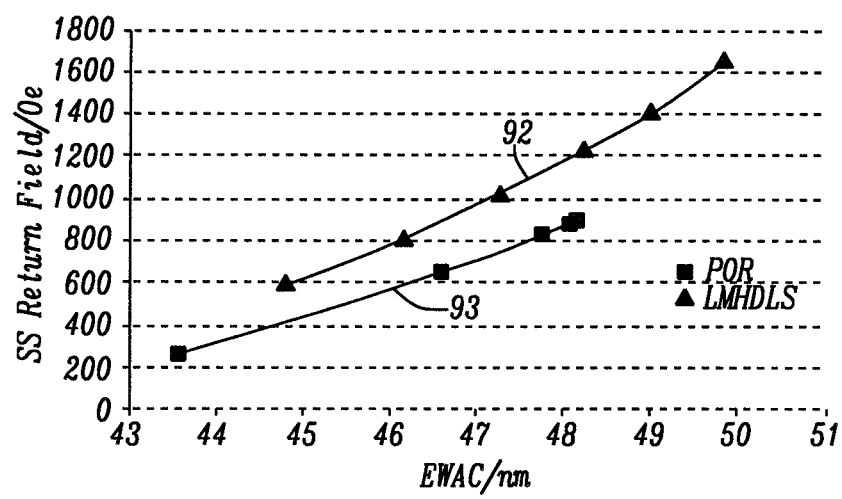
FIG. 12 shows FEM simulation results where SS return field is plotted vs. EWAC for the conventional shield design in FIG. 5 and the first embodiment in FIG. 6 where LSh is 150 nm.

FIG. 11 is a graph showing the results of a finite element modeling (FEM) study where TS return field vs. erase width under alternating current (EWAC) is shown for the PMR writer with the process of record (POR) shield structure in FIG. 5 (curve 90), and for the AWA shield design with LMHD magnetic material in the leading shield (curve 91) according to the first embodiment of the present disclosure. In particular, $\alpha$=0.02 and Bs=12 kG are used for the POR shield structure, $\alpha$=0.05 and Bs=4 kG for the LS in the first embodiment, and LSh (h1)=150 nm for both examples. FIG. 12 shows SS return field vs. EWAC using the same parameters for the POR shield structure and LS LMHD shield design described above. The results indicate that at a given EWAC, TS return field is substantially more negative with a LMHD LS compared with the POR design while SS return field becomes slightly more positive, indicating strong BPI gain with a slight TPI loss.

Figure 13A:
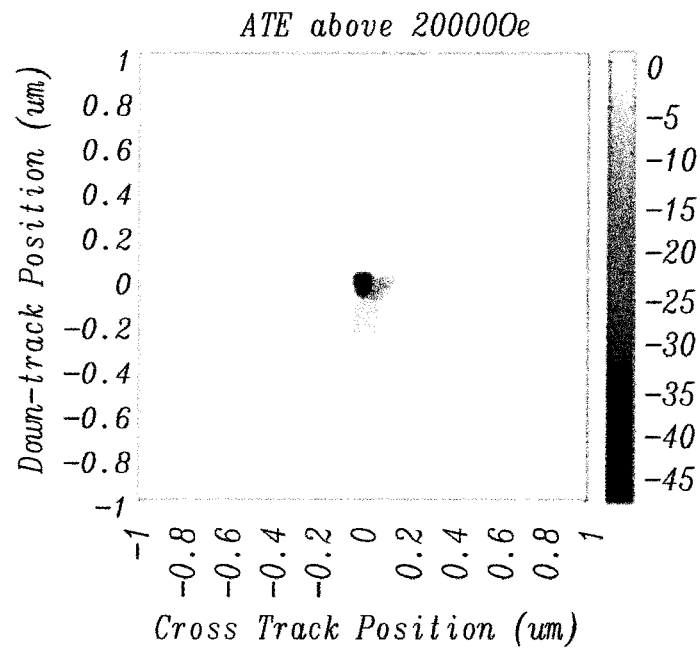
FIGS. 13A-13D show adjacent track erasure (ATE) mapping from a dynamic micromagnetic simulation for a conventional writer, first embodiment with LSh=150 nm, first embodiment with LSh=350 nm, and for a LS material with no magnetic moment, respectively.
Figure 13B:
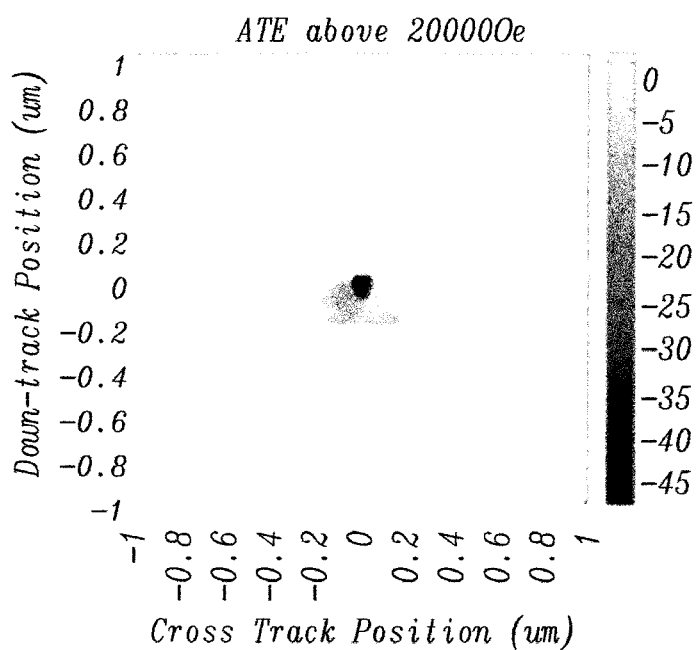
Figure 13C:
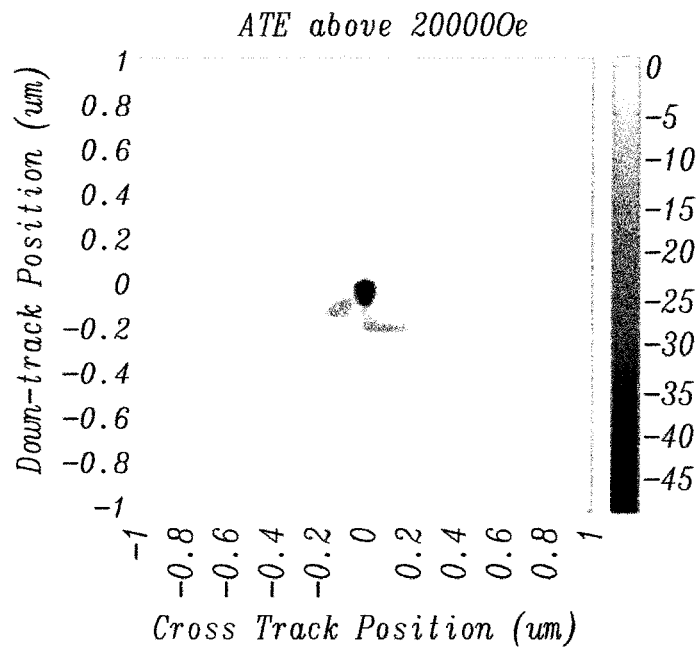
Figure 13D:
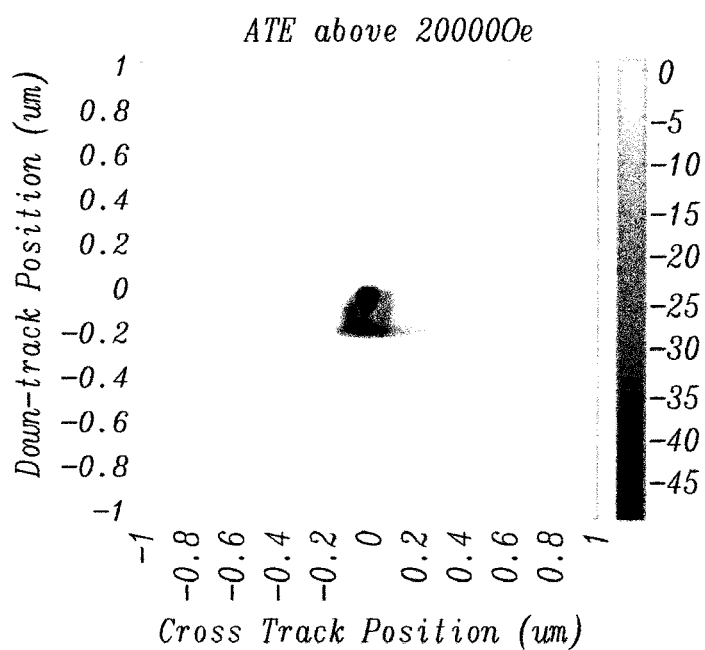

Referring to FIG. 13A, ATE mapping from a dynamic micromagnetic simulation is illustrated as a plot with cross-track position along the x-axis and down-track position on the y-axis for a conventional PMR writer with shield structure depicted in FIG. 5. Similarly, ATE mapping is provided for a shield structure having a LMHD LS according to a first embodiment of the present disclosure where LSh (h1)=150 nm (FIG. 13B), and LSh=350 nm (FIG. 13C). FIG. 13D is an example where the LS shield has no magnetic moment (Bs=0) and results indicate there is considerable ATE proximate to the LET edge. ATE is substantially reduced in FIG. 13B compared with FIG. 13D, and even further reduced in FIG. 13C where ATE is essentially equivalent to the POR example in FIG. 13A.

Figure 14A:
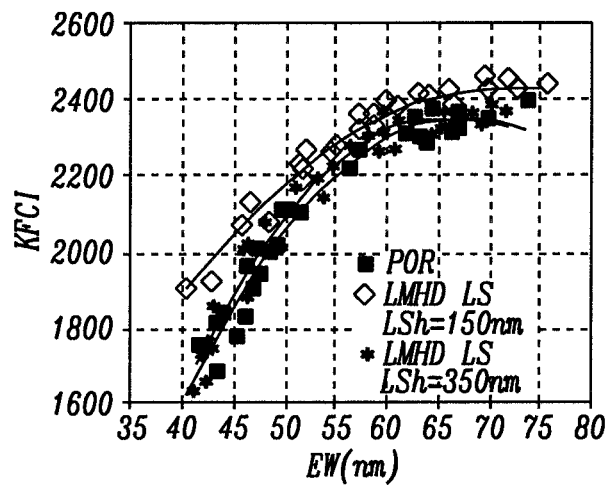
FIGS. 14A-14C are plots of kilo flux changes per inch (KFCI) vs. erase width (EW), kilotracks per inch (KTPI) vs. EW, and ADC vs. EW, respectively, for a conventional writer and for a PMR writer with a shield structure having a LMHD material in the leading shield according to an embodiment of the present disclosure.
Figure 14B:
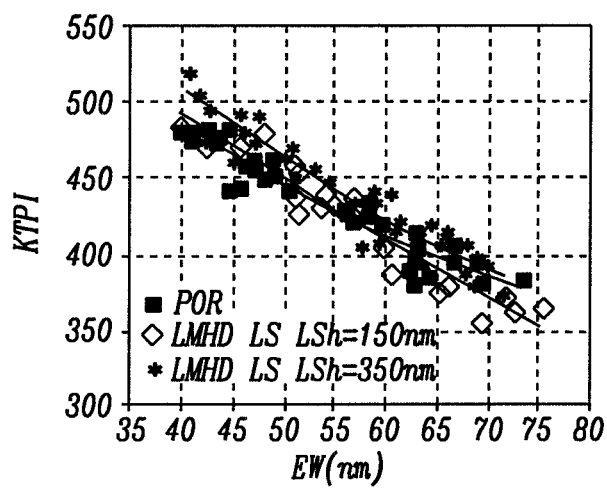
Figure 14C:
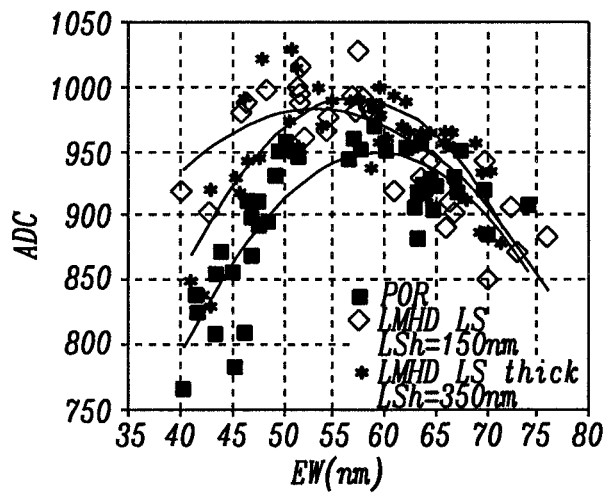

Device testing was performed and results relating to kilo flux changes per inch (KFCI) vs. erase width (EW), and kilotracks per inch (KTPI) vs. EW are shown in FIG. 14A and FIG. 14B, respectively, for the conventional PMR writer in FIG. 5, and for two examples of a PMR writer according to the first embodiment with a LMHD LS where LSh is 150 nm or 350 nm. FIG. 14C shows ADC vs. EW for the same three sample devices.

Results indicate that the shield structure with a LMHD LS having LSh=150 nm (equivalent to POR example) shows better KFCI and similar KTPI compared with the POR shield structure. Increasing LSh to 350 nm in the LMHD LS provides a gain in KTPI but with a slight KFCI tradeoff. In both examples with a LHMD LS, higher ADC is realized than with a conventional PMR writer.

The present disclosure also encompasses a method of forming a PMR writer having a shield structure wherein at least the leading shield is made of a LMHD material described earlier. Only the process steps from leading shield formation to trailing shield deposition are described. The remainder of the fabrication sequence comprises conventional steps that are well known in the art and are not described herein.

Figure 15:
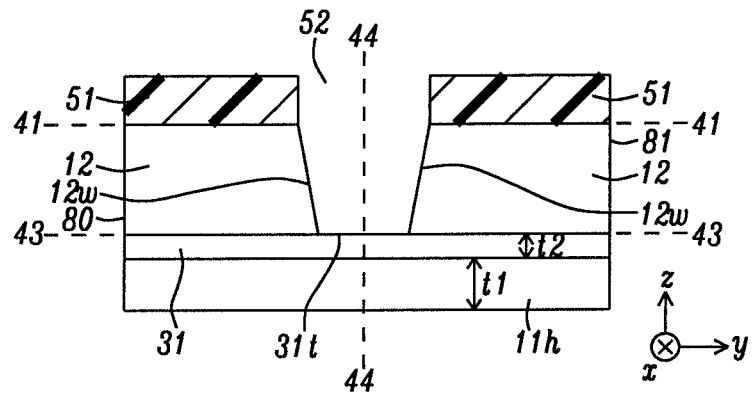
FIG. 15 and FIGS. 17-20 are ABS views.

From a cross-sectional perspective at the eventual ABS in FIG. 15, a LMHD magnetic layer 11h is deposited as the leading shield (LS) on a substrate (not shown) that may be leading shield connector (LSC) 33 in FIG. 4. The LMHD LS may be electroplated by a conventional method to a thickness t1. Thereafter, the LET layer 31 with thickness t2 is deposited on LS 11h. In other embodiments shown in FIGS. 7-8, where LET 31h is also a LMHD material, the LS and LET layers may be electroplated during the same process. Side shield 12 is electroplated on LET 31. In an alternative embodiment (FIG. 8) where the side shield is also made of a LMHD material, SS 12h is deposited on LET 31h.

Next, a photoresist layer 51 is coated on the SS top surface, and is patternwise exposed and developed by a conventional process to form an opening 52 therein that corresponds to the desired shape of the main pole to be deposited in a subsequent step. Thereafter, opening 52 is transferred by an etching process such as ion beam etch (IBE) through the side shield layer and stops at plane 43-43 to expose a portion of LET top surface 31t. The remaining SS portions on each side of center plane 44-44 have an inner sidewall 12w, and will hereafter be referred to as side shields 12.

Figure 16:
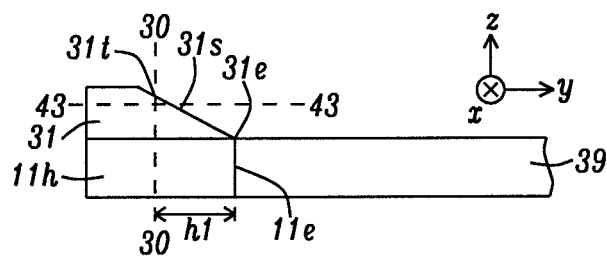
FIG. 16 is a down-track cross-sectional view that depicts a sequence of steps of forming an AWA shield structure according to an embodiment of the present disclosure.

FIG. 16 is a down-track cross-sectional view along plane 44-44 in FIG. 15 after the photoresist layer 51 is removed by a well-known method, and shows plane 30-30 that is the position of the ABS after a lapping process is performed at the end of the PMR writer fabrication sequence. A photoresist patterning and etching sequence as described in related U.S. Pat. No. 8,749,919 may be used to form a tapered trailing side 31s on LET 31 that intersects plane 30-30 at top edge 31t and terminates at a back end 31e, which is at the LSh h1 from the eventual ABS. The LET tapered side 31s has a decreasing down-track distance with increasing distance from plane 30-30. LS backside 11e also has the LSh h1 and adjoins a front side of insulation layer 39.

Figure 17:
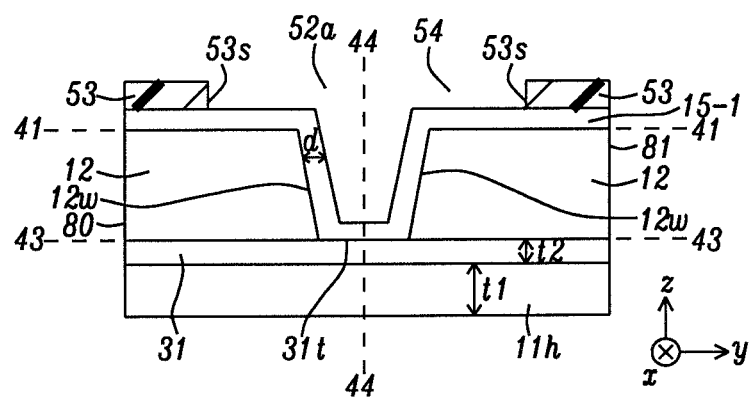

Referring to FIG. 17 that is a view from plane 30-30, gap layer 15-1 is preferably conformally deposited with a thickness d of about 20 to 50 nm on the exposed portion of LET tapered side including top edge 31t, sidewalls 12w, and on a top surface of side shields 12 to give an opening 52a that has a smaller cross-track width than original opening 52. The gap layer becomes the leading gap above the LET top edge and tapered side (not shown), and side gaps along sidewalls 12w in the final shield structure. It should be understood that the gap layer may be a composite such as a lower alumina layer, and an upper Ru layer disposed on the alumina layer. Thereafter, photoresist layer 53 is coated on the gap layer and is patterned by a conventional photolithography process to form opening 54 that exposes opening 52a and a top surface of the gap layer between photoresist sidewalls 53s and opening 52a.

Figure 18:
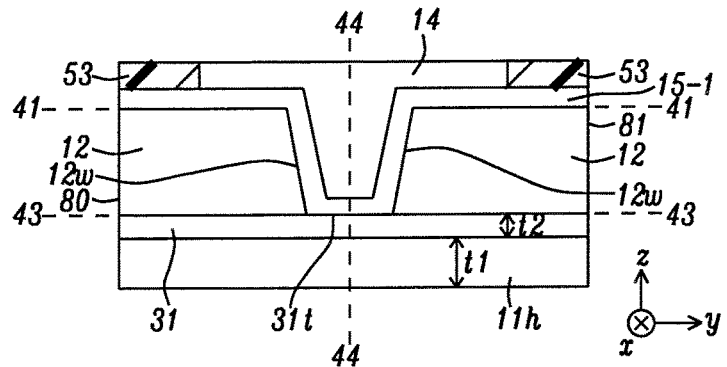
Figure 19:
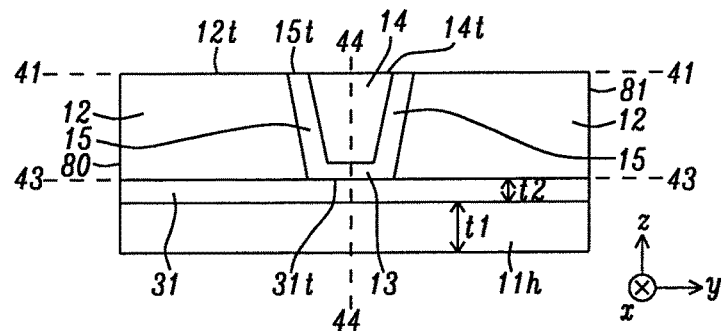

Referring to FIG. 18, the main pole 14 is electroplated to fill openings 52a, 54. In FIG. 19, the partially formed shield structure is depicted after a chemical mechanical polish (CMP) process is employed to remove photoresist layer 53 and also the top portions of the main pole and gap layer such that a top surface 12t of SS 12 becomes coplanar with a top surface 15t of side gap 15, and with MP trailing edge 14t at plane 41-41. Side portions of the gap layer are side gaps 15, and the bottom portion is now shown as leading gap 13.

In some embodiments, ion milling may be used to form a taper on the MP trailing side which has a front end at edge 14t by using a process sequence previously described in related U.S. Pat. No. 8,749,919.

Figure 20:
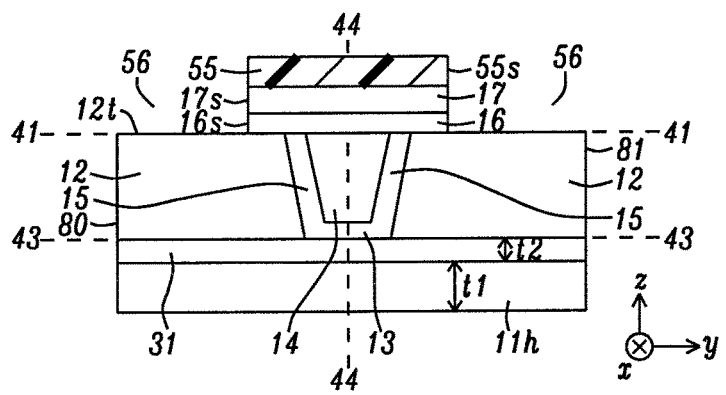

Referring to FIG. 20, a conventional process sequence known to those skilled in the art is used to form a write gap 16 and overlying first TS layer (hot seed) 17 each with a cross-track width w above MP trailing edge 14t, side gaps 15, and above a portion of top surface 12t adjacent to the MP 14. In particular, a photoresist layer 55 is coated on the first TS layer and is patterned to generate sides 55s and opening 56 adjacent to each side. The openings are expanded downward through the first TS layer and write gap by an IBE, for example, to form write gap side 16s and first TS side 17s that are coplanar with side 55s on each side of center plane 44-44.

Returning to FIG. 6, a cross-sectional view is shown along the eventual ABS plane 30-30 after photoresist layer 55 is stripped, and a second TS 18 is electroplated on hot seed layer 17 and on exposed portions of top surface 12t to form the AWA shield structure. A planarization step such as a second CMP process may be performed to form a planar top surface 18t on the second TS.

There is flexibility in the shield structure of the embodiments disclosed herein in that conventional magnetic layers in one or more of the LET, side shields, and second trailing shield may be replaced with a HD magnetic layer with a damping constant $\alpha$ of at least 0.04 while maintaining a Bs in the range of 10-19 kG.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer formed on a slider in a head gimbal assembly (HGA), comprising:
   - (a) a main pole having a leading side adjoining a leading gap, and with a leading edge at an air bearing surface (ABS), and having a trailing side adjoining a write gap, and a trailing edge at the ABS;
   - (b) a gap layer surrounding the main pole, the gap layer includes the leading gap, the write gap, and a side gap that contacts each of two sidewalls of the main pole wherein each sidewall is equidistant from a center plane that is aligned orthogonal to the ABS; and
   - (c) a shield structure wherein at least a leading shield (LS) is made of a low moment high damping (LMHD) magnetic material having a damping constant $\alpha$ of at least 0.04 and a magnetic flux density (Bs) from 1 kiloGauss (kG) to 8 kG, comprising:
     - (1) a leading edge taper (LET) layer having a tapered side that contacts the leading gap at a first plane that is orthogonal to the center plane at the ABS, the tapered side extends from a front side at the ABS to a first height (h1) such that the LET layer has decreasing thickness with increasing height from the ABS;
     - (2) the leading shield (LS) with a top surface that contacts a bottom surface of the LET layer, and wherein the LS has a backside at h1;
     - (3) a trailing shield (TS) structure wherein a first TS layer made of a 19-24 kG material adjoins a top surface of the write gap, and a second TS layer adjoins a top surface of the first TS layer, and contacts a top surface of two side shields at a second plane that is parallel to the first plane; and
     - (4) the side shields wherein a side shield on each side of the center plane has an inner side adjoining the side gap.

2. The PMR writer of claim 1 wherein the LMHD magnetic material is an alloy that is one of FeNiM, FeCoM, FeNM, and FeCoNiM where M is one of Re, Os, Ir, Rh, Ti, Ta, V, Cr, W, Mn, Mo, Cu, Zr, Nb, Hf, Ru, Pd, Pt, Ag, and Au.

3. The PMR writer of claim 2 wherein the LMHD magnetic material has a M content from about 1 atomic % to 10 atomic %.

4. The PMR writer of claim 1 wherein the LET layer is comprised of the LMHD material.

5. The PMR writer of claim 4 wherein the side shields are comprised of the LMHD material.

6. The PMR writer of claim 1 wherein h1 is from about 50 nm to 500 nm.

7. The PMR writer of claim 1 wherein the leading shield has a first thickness (t1) that is from 50 nm to 1000 nm.

8. The PMR writer of claim 7 wherein the LET layer has a second thickness (t2) at the ABS that is from 5 nm to 200 nm, and where t2<t1.

9. The PMR writer of claim 1 wherein a coercivity (Hc) of the LMHD magnetic material is less than 50 Oe.

10. The PMR writer of claim 1 wherein each of the LET layer, side shields, and second TS layer are comprised of a magnetic material with a damping constant of at least 0.04.

11. The PMR writer of claim 1 wherein the LET layer contacts each side shield at the first plane on each side of the leading gap.

12. The HGA of claim 1 wherein a suspension has a flexure to which the slider is joined, a load beam with one end connected to the flexure, and a base plate connected to the other end of the load beam.

13. A magnetic recording apparatus, comprising:
   - (a) a magnetic read head structure and the HGA of claim 12;
   - (b) a magnetic recording medium positioned opposite to the slider;
   - (c) a spindle motor that rotates and drives the magnetic recording medium; and
   - (d) a device that supports the slider, and that positions the slider relative to the magnetic recording medium.

* * * * *